United States Patent
Huang

[11] Patent Number: 5,827,129
[45] Date of Patent: Oct. 27, 1998

[54] GRIP FOR GOLF CLUB SHAFTS

[76] Inventor: Ben Huang, 16652 Gemini La., Huntington Beach, Calif. 92647

[21] Appl. No.: 857,210

[22] Filed: May 14, 1997

Related U.S. Application Data

[60] Division of Ser. No. 632,578, Apr. 15, 1996, Pat. No. 5,671,923, which is a continuation-in-part of Ser. No. 595,445, Feb. 26, 1996, abandoned, which is a continuation-in-part of Ser. No. 507,575, Jul. 26, 1995, abandoned, which is a continuation-in-part of Ser. No. 58,313, May 3, 1993, Pat. No. 5,695,418, which is a continuation-in-part of Ser. No. 953,190, Sep. 29, 1992, abandoned, which is a continuation-in-part of Ser. No. 890,383, May 26, 1992, abandoned, which is a continuation-in-part of Ser. No. 637,931, Jan. 14, 1991, abandoned.

[51] Int. Cl.$^6$ .................................................. A63B 53/14
[52] U.S. Cl. ............................................ 473/301; 473/549
[58] Field of Search .................................. 473/300, 301, 473/302, 303, 549

[56] References Cited

U.S. PATENT DOCUMENTS

| | | | |
|---|---|---|---|
| 979,242 | 1/1910 | Onions | 327/63 |
| 1,139,843 | 5/1915 | Brown . | |
| 1,556,781 | 10/1925 | Gjorup . | |
| 1,701,856 | 2/1929 | Kraeuter . | |
| 1,940,104 | 12/1933 | Russell et al. | 273/81 |
| 1,943,399 | 1/1934 | Smith | 273/81 |
| 2,003,917 | 6/1935 | Bowden | 273/75 |
| 2,046,164 | 6/1936 | Herkner | 273/81 |
| 2,086,062 | 7/1937 | Bray | 273/81 |
| 2,166,044 | 7/1939 | Fletcher | 273/75 |
| 2,166,045 | 7/1939 | Fletcher | 273/75 |
| 2,513,655 | 7/1950 | Lamkin et al. | 273/81 |
| 3,582,456 | 6/1971 | Stolki | 161/165 |
| 3,654,066 | 4/1972 | Fukushima et al. | 161/160 |
| 3,845,954 | 11/1974 | Case | 273/75 |
| 3,848,480 | 11/1974 | Oseroff | 74/558.5 |
| 3,848,871 | 11/1974 | Sweet | 273/75 |
| 3,860,469 | 1/1975 | Gregoprian et al. | 156/83 |
| 3,881,521 | 5/1975 | Johansen et al. | 138/126 |
| 3,899,172 | 8/1975 | Vaughn et al. | 273/73 |
| 4,015,851 | 4/1977 | Pennell | 273/75 |
| 4,044,625 | 8/1977 | D'Haem | 74/558.5 |
| 4,070,020 | 1/1978 | Dano | 273/73 |
| 4,100,006 | 7/1978 | Buckley | 156/78 |
| 4,174,109 | 11/1979 | Gaiser | 273/81.6 |
| 4,284,275 | 8/1981 | Fletcher | 273/75 |
| 4,347,280 | 8/1982 | Lau et al. | 428/304.4 |
| 4,454,187 | 6/1984 | Flowers et al. | 428/159 |
| 4,567,091 | 1/1986 | Dpector | 428/222 |
| 4,647,326 | 3/1987 | Pott | 156/77 |
| 4,660,832 | 4/1987 | Shomo | 273/73 |
| 4,662,415 | 5/1987 | Prout | 150/52 |
| 4,736,949 | 4/1988 | Muroi | 273/73 |
| 4,765,856 | 8/1988 | Doubt | 156/212 |
| 4,853,054 | 8/1989 | Turner et al. | 156/78 |
| 4,934,024 | 6/1990 | Sexton, I | 16/111 |
| 5,042,804 | 8/1991 | Uke | 273/75 |
| 5,110,653 | 5/1992 | Landi | 428/116 |
| 5,275,407 | 1/1994 | Soong | 273/73 |
| 5,435,549 | 7/1995 | Chen | 273/75 |
| 5,467,984 | 11/1995 | Veux et al. . | |

FOREIGN PATENT DOCUMENTS

| | | |
|---|---|---|
| 566538 | 2/1924 | France . |
| 2398099 | 7/1977 | France . |
| 2805314 | 8/1979 | Germany . |
| 3414978 | 10/1985 | Germany . |
| 443228 | 2/1936 | United Kingdom . |
| 870021 | 6/1961 | United Kingdom . |

*Primary Examiner*—W. Stoll
*Attorney, Agent, or Firm*—Fulwider Patton Lee & Utecht, LLP

[57] ABSTRACT

A golf club shaft grip having a polyurethane layer bonded to a felt layer with the thickness of the polyurethane layer to the felt layer being a minimum of about 0.18. The bonded-together layers are configured as a strip which is spirally wrapped about the shaft. A cap is then telescopically applied over the upper end of the shaft to prevent unraveling of the strip from the shaft. Alternatively, a split sleeve may be applied to the shaft to receive the strip.

4 Claims, 6 Drawing Sheets

FIG. 1
FIG. 2
FIG. 3
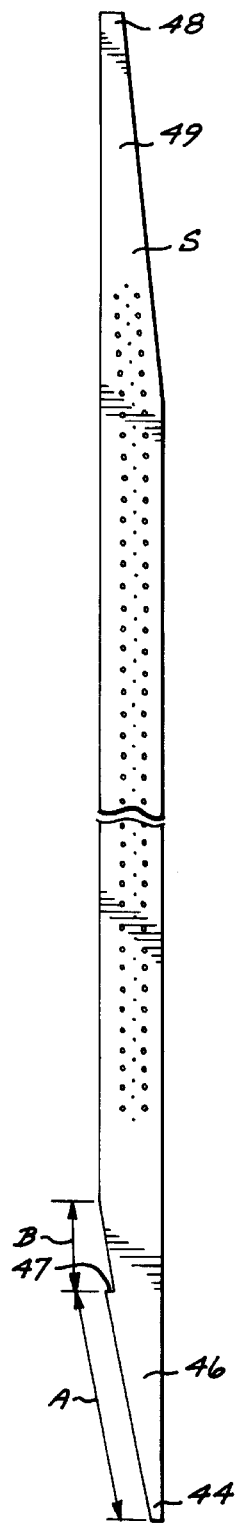
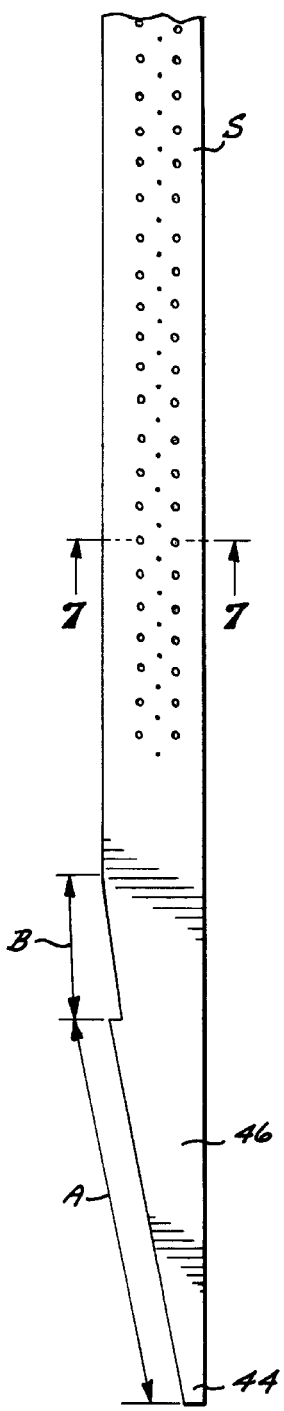
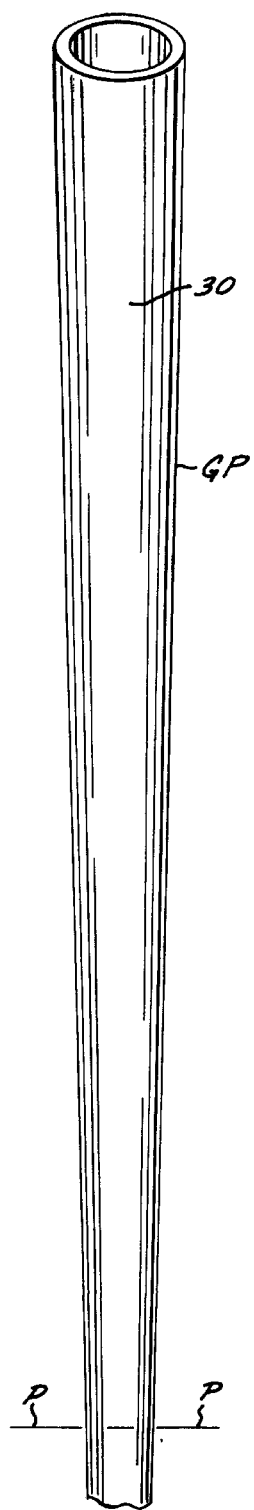

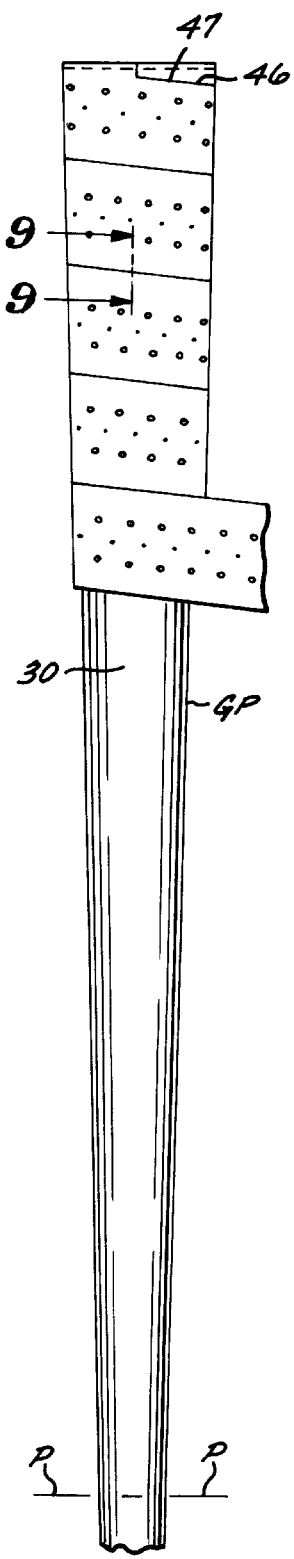
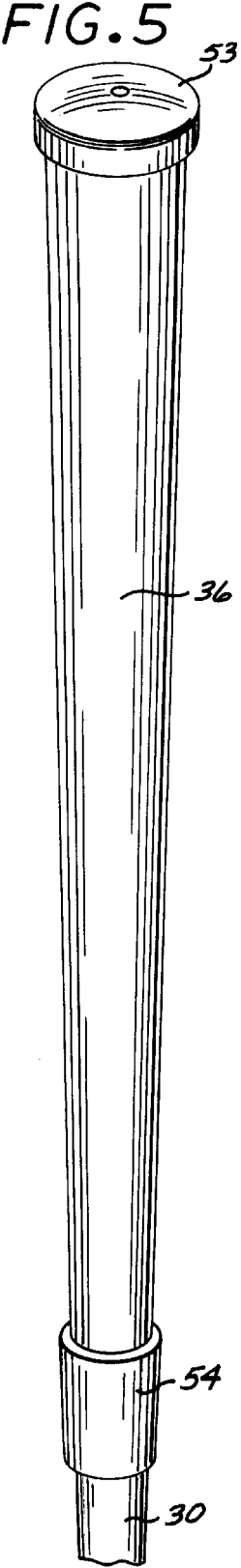
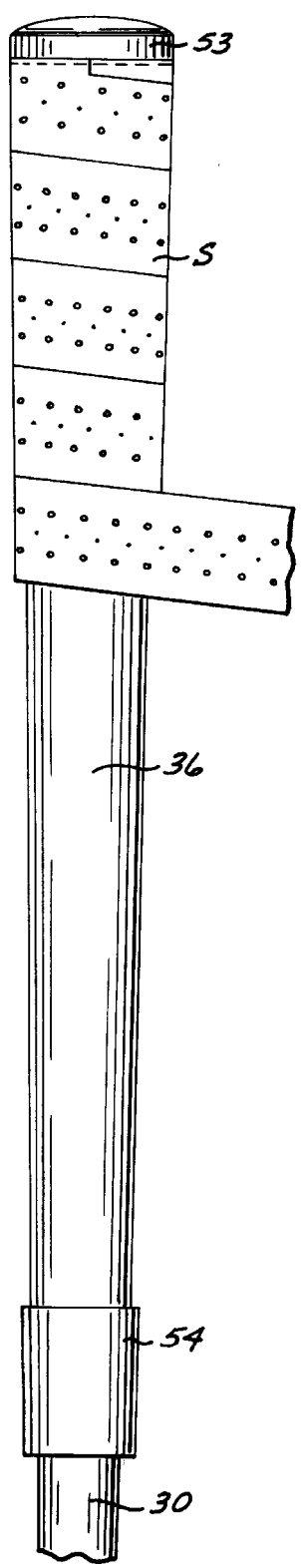

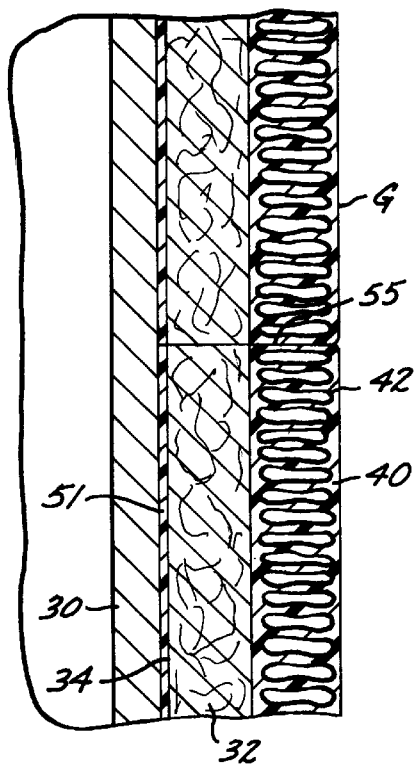
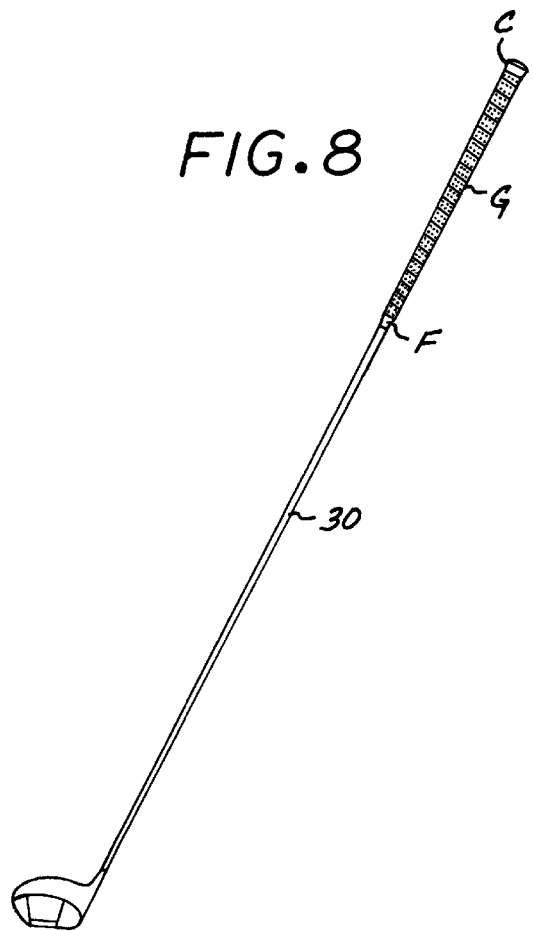
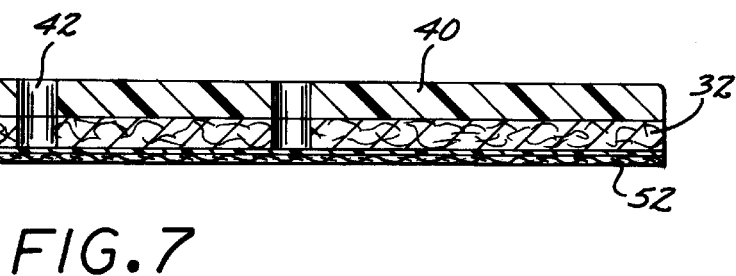

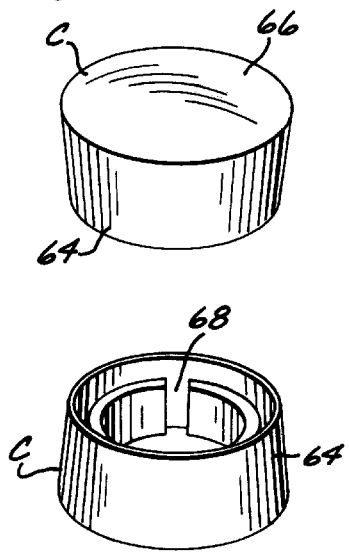
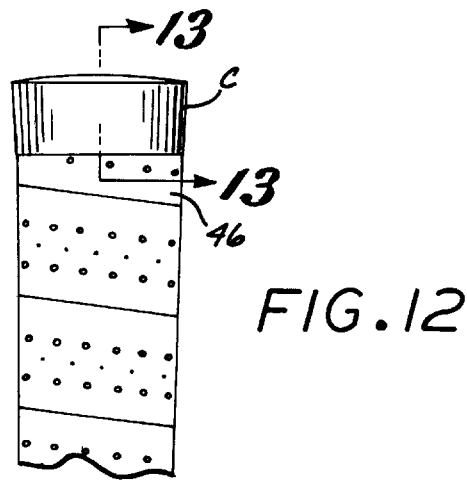
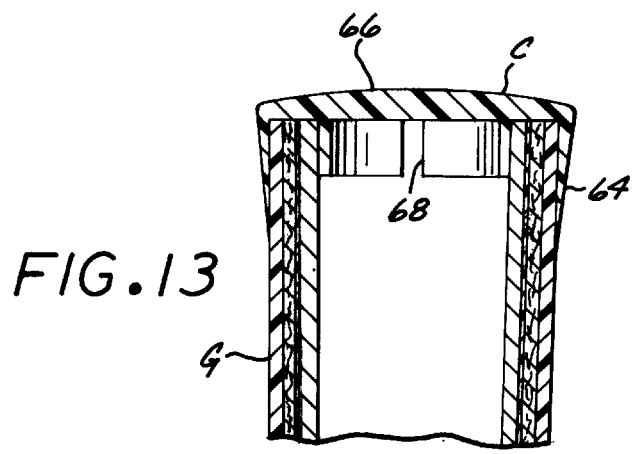
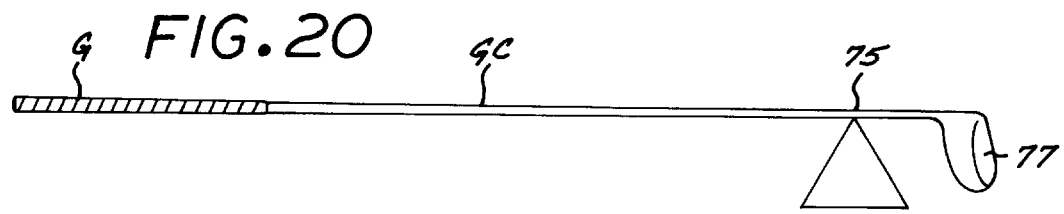
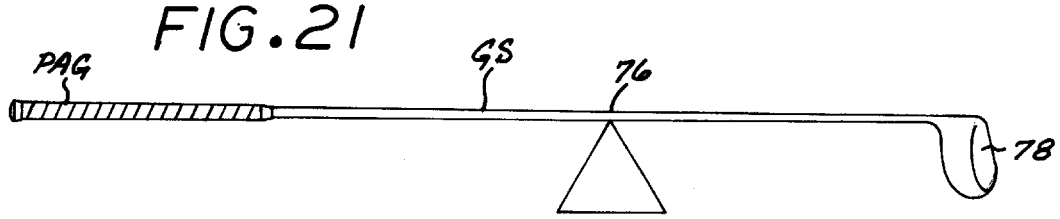

GRIP FOR GOLF CLUB SHAFTS

This application is a division of Ser. No. 08/632,578 filed on Apr. 15, 1996, now U.S. Pat. No. 5,671,923, which was a Continuation-In-Part of Ser. No. 08/595,445 filed on Feb. 26, 1996, now abandoned, which was a Continuation-In-Part of Ser. No. 08/507,575 filed on Jul. 26, 1995 now abandoned, which was a Continuation-In-Part of Ser. No. 08/058,313 filed on May 3, 1993 now, U.S. Pat. No. 5,695,418, which was a Continuation-In-Part of Ser. No. 07/953,190 filed on Sep. 29, 1992, now abandoned, which was a Continuation-In-Part of Ser. No. 07/890,383 filed on May 26, 1992, now abandoned, which was a Continuation-In-Part of Ser. No. 07/637,931 filed on Jan. 14, 1991 now abandoned.

BACKGROUND OF THE INVENTION

It is well known that shock generated by impact between a golf club and a golf ball can adversely affect muscle tissue and arm joints such as elbow joints. The energy generated by such shock is usually of high frequency and short duration with rapid decay, and which is often known as "impact shock." Tight grasping of a grip to keep it from slipping contributes to the shock to the muscle tissue and arm joints of the users golf clubs. Prior art golf club shaft grips have generally been made of leather and later of rubber made to look like leather. Additionally, conventional golf club grips are molded from a single piece of rubber or synthetic plastic. When it is necessary to replace the original grip, such replacement is difficult and cannot be accomplished by the average golfer. Accordingly, the golfer is required to leave his golf club at a golf shop for several days for application of the replacement grip.

Prior art rubber grips have been comparatively heavy compared to the total weight of the golf club. In the case of a driver, the grip can weight 53–57 grams. The heavy weight of such grip retains the center of gravity away from the club head, and reduces the club head speed while reducing the club's moment of inertia so as to limit the distance of the ball travel.

Most conventional golf club grips are formed with a longitudinal profile having a constant straight slope or taper extending downwardly from the top of the golf club shaft toward the head of the club. This constant straight slope or taper, however, does not provide the optimum control of the club for all golfers. It is therefore desirable to be able to vary the longitudinal profile of a golf club grip to meet the desires of any particular golfer, i.e. a person with small hands usually obtains better results with a grip of reduced diameter as compared to a person with large hands. On the other hand, senior golfers with arthritis who have difficulty in manipulating their fingers and golfers who have unusually large hands prefer oversized golf grip. However, most conventional golf club grips do not meet their requirements.

SUMMARY OF THE INVENTION

Applicant has developed an improved golf club shaft grip designed to solve all of the above set forth problems.

A preferred form of golf club grip embodying the present invention utilizes an elongated resilient strip comprising a layer of a textile, such as felt, bonded to a layer of polyurethane. The felt layer is adhered to and provides strength to the polyurethane layer. The polyurethane layer is of closed pore construction which provides a cushioned grip and enhanced tackiness to the golfer's hand.

The golf club grip of the present invention has been found to greatly cushion the shock transferred from a golf club to the golfer's body and thereby prevent the danger of injury to the golfer during a golf swing. Yet the golf club grip of the present invention can be made lighter than conventional grips to reduce the weight of a golf club thereby permitting the redistribution of the weight to the golf club to the golf club head so as to increase the moment of inertia, with a resulting increase in the distance of travel of a golf ball. This advantage can be enhanced if the golf club shaft is flared radially outwardly at its grip-receiving portion.

Preferably, the pores of the polyurethane layer will extend vertically relative to the longitudinal axis of the strip. The ratio of the thickness of the polyurethane layer to the felt layer should be a minimum of approximately 0.18. The strip may be spirally wrapped directly about a golf club shaft, or alternatively, spirally wrapped about a resilient sleeve which is slipped over and adhered to the grip-receiving upper portion of a golf club. Such sleeve may vary in profile along its longitudinal axis so that when the strip is wrapped about the sleeve, the longitudinal profile of the sleeve and grip may, if desired, conform to a desired configuration different than the longitudinal profile of the original conventional grip and shaft. The inside of the sleeve of which abuts the golf club shaft is provided with an adhesive that is originally covered with a protective quick-release tape. The tape is peeled off the adhesive and the strip is then spirally wrapped about the golf club shaft with the edges of the sleeve in tight abutment so as to provide a smooth contour. This arrangement provides an improved securement of the grip to the golf club shaft, with such securement increasing in use the tighter the grip is grasped by the golfer. In one form of the invention, the sleeve is formed with a longitudinal slit which receives the shaft and a unique adhesive carrier is interposed between the sleeve and the shaft. This construction permits a golfer to easily replace a grip without using a solvent or tools thereby eliminating the cost and delay involved with replacing a conventional grip.

These and other features and advantages of the present invention will become apparent from the following detailed description, when taken in conjunction with the accompanying drawings.

BRIEF DESCRIPTION OF THE DRAWINGS

FIG. 1 is a top plan view of a resilient strip member of a preferred of golf club shaft grip embodying the present invention;

FIG. 2 is a broken top plan view of the strip of FIG. 1 in enlarged scale;

FIG. 3 is a broken perspective view of a golf club shaft adapted to receive the strip of FIGS. 1 and 2;

FIG. 4 is a side elevation view showing a strip of the type shown in FIGS. 1 and 2 being wrapped about the golf club shaft of FIG. 3;

FIG. 5 is a broken perspective view showing a resilient sleeve applied to the upper end of a golf club shaft to receive the strip of FIGS. 1 and 2;

FIG. 6 is a broken side elevational view showing the strip of FIGS. 1 and 2 being wrapped about the sleeve of FIG. 6;

FIG. 7 is a vertical sectional view taken in an enlarged scale along line 7–7 of FIG. 2;

FIG. 8 is a reduced perspective view of a golf club provided with a grip embodying the present invention;

FIG. 9 is a vertical sectional view taken in an enlarged scale along line 9–9 of FIG. 4;

FIG. 10 is a perspective view showing a cap member of the grip of the present invention;

FIG. 11 is a perspective view showing the cap of FIG. 10 inverted from its position of FIG. 10;

FIG. 12 is a broken side elevational view showing the cap of FIGS. 10 and 11 applied over the upper end of the strip of FIGS. 1 and 2 after such strip has been wound around the golf club shaft of FIG. 3;

FIG. 13 is a broken side elevational view taken along line 13–13 of FIG. 12;

FIG. 20 and 21 are diagrametric views comparing the weight relationship between a golf club embodying a grip of the present invention and a standard golf club.

DETAILED DESCRIPTION OF PREFERRED EMBODIMENTS

Figure 14:
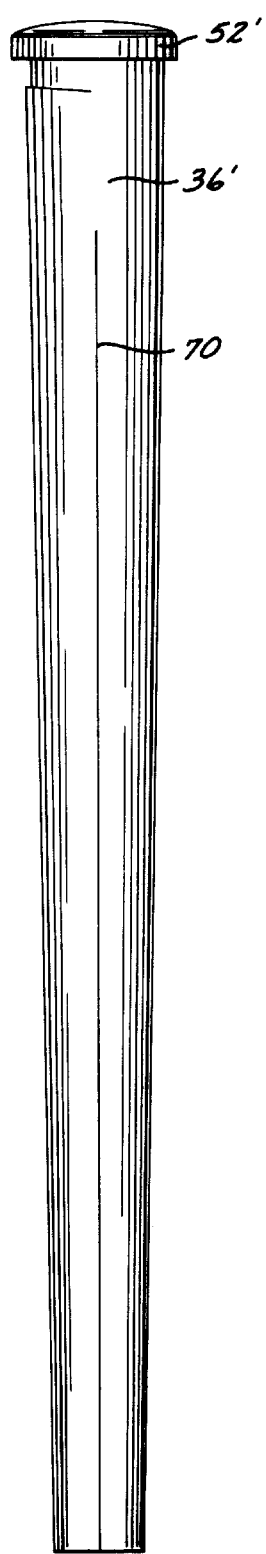
FIG. 14 is a side elevational view of a split sleeve element of a grip embodying the present invention.
Figure 15:
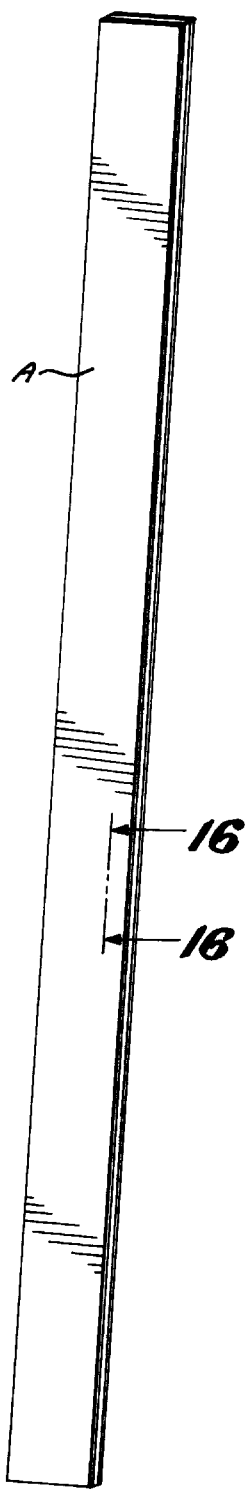
FIG. 15 is a perspective view showing an adhesive carrier utilized to apply the sleeve of FIG. 14 to a golf club shaft.

Referring to the drawings, a preferred grip G embodying the present invention utilizes an elongated polyurethane and felt strip S shown in FIG. 1 and 2 which is spirally wrapped about the shaft 30 of a golf club as shown in FIG. 8. Grip G also includes an annular cap C, shown particularly in FIGS. 10 and 11, which is telescopically received by the upper end of shaft 30 to positively restrain the upper end of the strip from unraveling relative to the golf club shaft.

More particularly, as shown in FIG. 9, grip G includes an open-pored felt layer, generally designated 32, having an inner or bottom surface 34 which is adhered to a golf club shaft 30 as shown in FIG. 4 or alternatively to a resilient sleeve 36 telescopically attached to the upper portion of golf club shaft 30 as indicated in FIG. 6. As shown particularly in FIG. 9, a smooth closed pore polyurethane layer, generally designated, 40 is bonded to the upper surface of the felt layer 32. The bonded-together polyurethane and felt layers are seen to be configured as unitary strip S shown in plan view in FIGS. 1 and 2.

The polyurethane layer 40 provides a cushioned grip of the player's hand on a golf club shaft and also enhances a player's grasp of the golf club by providing increased tackiness between the player's hand and the grip. The felt layer 32 provides strength to the polyurethane layer and serves as a means for attaching the bonded-together polyurethane and felt strip to the golf club shaft or the sleeve. The polyurethane and felt layers may be formed with vertically extending perforations 42 shown in enlarged scale in FIG. 7, which enhance S the absorption rate of perspiration from a user's hand and also enhances the cushioning effect of the grip by providing a controlled restriction of air escaping from within the pores of the felt layer when the grip is grasped by a golfer.

The felt layer 32 of the strip is formed of a suitable open-pored material and has its upper or outer surface bonded to the lower surface of the polyurethane layer 40. As indicated in FIG. 9, the pores 42 of polyurethane layer 40 extend vertically, i.e. generally normal to the longitudinal axis of the strip S and golf club shaft 30 when the grip has been affixed to such shaft. The polyurethane layer 40 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat In this manner, the pores 42 will extend perpendicularly relative to the longitudinal axis of the strip, while the underside of the polyurethane layer is bonded to the upper surface of the felt strip. Applicant has discovered that greatly improved shock absorbing qualities may be obtained in a golf club grip where the ratio of the thickness of the polyurethane layer to the thickness of the felt layer is increased over such as employed in prior art grips. More specifically, applicant considers that the ratio of the thickness of the polyurethane layer to the textile layer should be a minimum of approximately 0.18 in order that pores 42 may be formed. Excellent results have been obtained with this ratio, since the pores 42 permit the polyurethane layer to be readily compressed by the gripping force of a golfer's hands when making a swing.

As indicated in FIGS. 1 and 2, the starting or butt end 44 of strip S is cut away at an angle to define a tongue 46. An inwardly extending notch 47 is formed at the inner portion of the tongue. The trailing edge 48 of the strip is also cut away at an angle to define a second tongue 49. As further shown in FIGS. 1 and 2, the tongue and notch dimensions A and B will differ depending on the dimensions of the butt end of the particular shaft receiving the grip.

Referring now to FIGS. 4 and 9, to apply the strip G to the golf club shaft 30, an adhesive 51 originally covered by a quick-release tape 52 (FIG. 7) is peeled off the adhesive on the underside of the felt layer 32. The strip S is then spirally wound around the shaft starting with the butt or top end of the shaft. As indicated in FIG. 4, the point of starting end 44 (relative to the shaft's butt end) of tongue 46 fits snugly within the notch 47 so as to provide a smooth configuration of the strip relative to the exterior of the golf club shaft 30. After the strip S has been completely wound about the shaft 30 its lower end may be secured in place by finishing tape (not shown) and/or a conventional resilient ferrule F (FIG. 8) to prevent unraveling of the lower portion of the strip relative to the shaft. It should be noted that tongue 46 permits the strip's trailing end 48 to provide a smooth transition of the strip to the golf club shaft. Referring to FIGS. 3 and 4, the grip-receiving portion GP will preferably be flared radially outwardly from a plane P—P at the upper portion of the shaft relative to the angle of flare of the shaft below such plane. This arrangement eliminates the need of an underlisting on such grip-receiving shaft portion thereby effecting a weight reduction as compared to standard grips.

It should be noted that with a fixed shaft geometry (or size), applicant can make the strip S in different thicknesses to accommodate different golf grip sizes required by senior, small or large golfer's hands.

Referring now to FIGS. 5 and 6, the aforedescribed strip S of FIGS. 1 and 2 is shown being spirally wrapped around the resilient rubber-like sleeve 36. Sleeve 36 is of synthetic plastic foam or rubber construction utilizing an integral cap 53. The lower portion of sleeve 36 is formed with an enlarged diameter guide cylinder 54. The sleeve 36 is shown slipped over the handle portion of golf club shaft 30 with the underside of the cap 53 abutting the top of the shaft. Strip S is spirally wrapped about sleeve 36. As indicated in FIG. 9, the side edges of the strip are disposed in tight abutment at 55. The wound strip S extends from the underside of the cap 53 to the top of the guide cylinder 54. Finishing tape or the like (not shown) may be wrapped around the lower portion of the strip S and the guide cylinder 54 to prevent unraveling of the strip relative to the cylinder. It should be noted that rather than wrapping the strip S around the sleeve 36 after the sleeve has been applied to a golf club shaft, the sleeve may be mounted on a tapered mandrel (not shown) and the strip spirally wrapped about the sleeve. The resulting assembly of sleeve and strip may be marketed as a replacement grip or as original equipment installed on a complete golf club.

Referring to FIGS. 10–13, annular cap C is of integral construction and includes a vertical inner skirt 62, a vertically tapered outer skirt 64, and a horizontal slightly domed cover 66. Cover C is preferably molded from a stiff, synthetic plastic material, such as polypropylene, polyethylene or ABS. A vertically extending expansion slot 68 is formed in inner skirt 62. It is desirable that the inner skirt taper at the same angle as the interior of shaft 30 and be tightly telescopically received by the upper open end of shaft 30. Expansion slot 68 permits a tight fit to be obtained between the inner skirt and the interior of the golf club shaft even where the outer diameter of the inner skirt is slightly greater than the shaft's inner diameter. Also, the inner diameter of outer skirt 64 should be so dimensioned that it can tightly telescopically enclose the first wrap of strip S, as shown in FIG. 13. It has been determined that an outer skirt depth of about 8 mm for a conventional driver affords good results.

Cap C is secured to the upper end of shaft 30 after strip S has been spirally wrapped thereabout. It is important that the outer skirt 64 extend downwardly a sufficient distance over the upper portion of the wrapped strip to ensure the strip does not unravel relative to the shaft when a golf club is being used in play, and particularly when the club is being removed from and returned to a golf bag by contact with the other golf clubs in the bag. The dimensions of the outer skirt, however, should not interfere with the golfer's grasp of the club. Cap C is seen to effectively prevent unraveling of the strip from the shaft.

Figure 16:
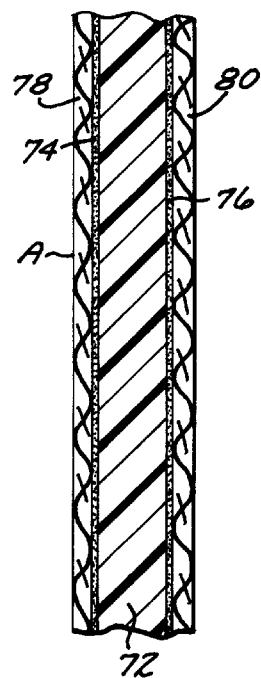
FIG. 16 is a vertical sectional view taken in enlarged scale along line 16–16 of FIG. 15.
Figure 17:
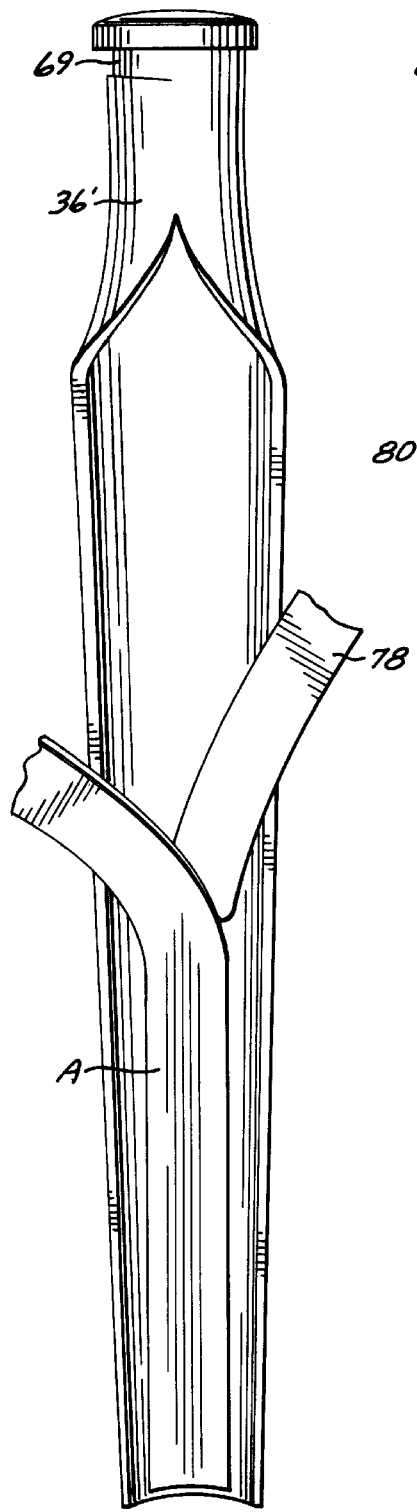
FIG. 17 is a side elevational view showing the adhesive carrier being applied to the interior of the split of FIG. 14.

Referring now to FIGS. 14–19, there is shown a split sleeve 36' which may be utilized with the golf club grip embodying the present invention in place of the solid sleeve 36 shown in FIGS. 5 and 6. Such sleeve may be of unitary synthetic plastic foam or rubber construction utilizing an integral cap 52' which is adapted to abut the upper end of the golf club shaft 30. The inner diameter of the sleeve 52' should be so selected as to effect a snug fit with the grip receiving portion of the golf club shaft when the sleeve is applied thereto. A recess 69 is formed in sleeve 36' to receive tongue 44 of the leading edge of the strip. One side of the sleeve 36' is formed with a longitudinally extending slit 70. It is important to note that the sleeve 36' is affixed to the golf club shaft utilizing an elongated, flat adhesive carrier A shown in FIGS. 15–18. The inner surface of adhesive carrier A includes a body 72 coated with a suitable adhesive 74 on its inner surface. Body 72 is coated on its outer surface with the same type of adhesive 76. Protective tapes 78 and 80 initially cover adhesives 74 and 76, as shown in FIG. 16. Tape 78 is first peeled off adhesive 74 and the adhesive carrier A is secured within sleeve 32', the sleeve being opened as shown in FIG. 17.

Figure 18:
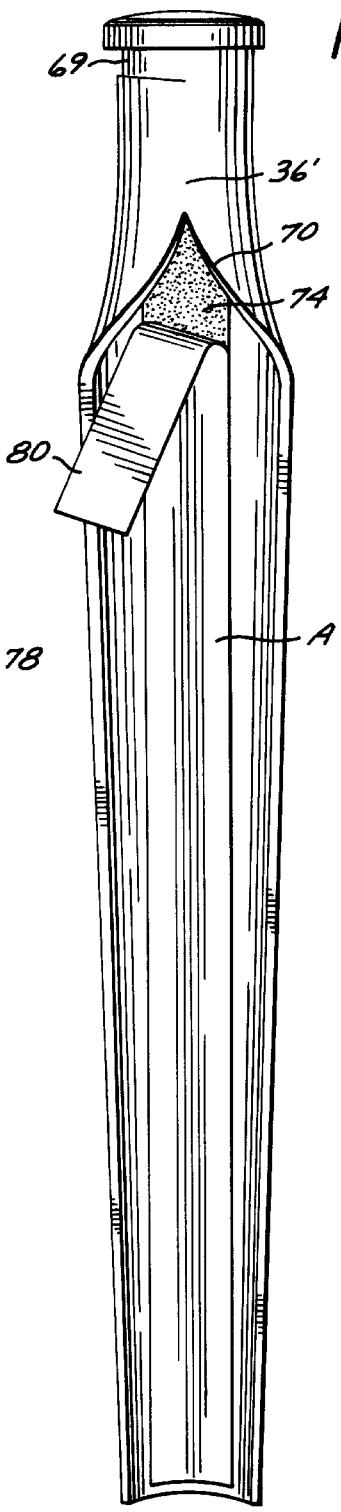
FIG. 18 is a side elevational view showing a first step in applying the split sleeve to a golf club shaft.
Figure 19:
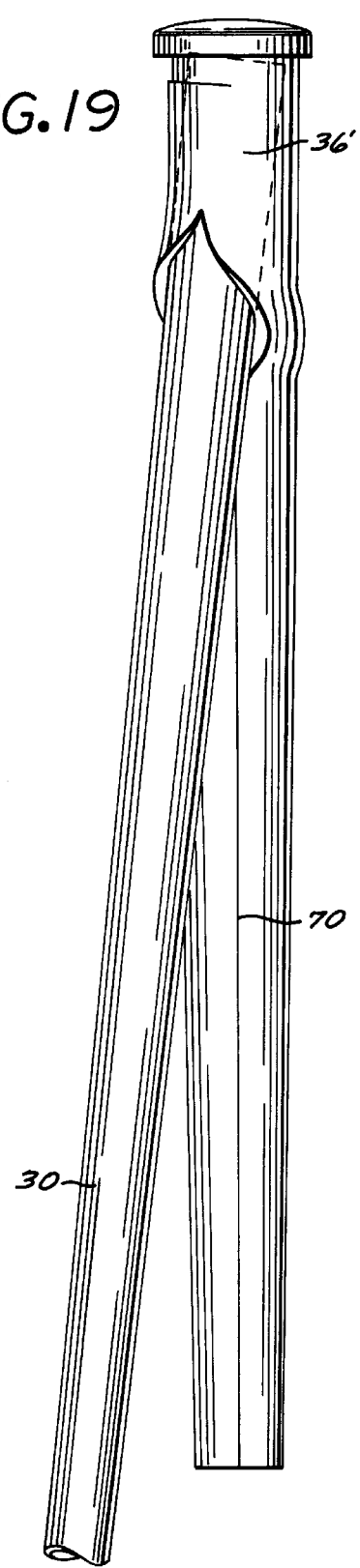
FIG. 19 shows the split sleeve as applied to a golf club shaft.

To apply the sleeve 36' to the upper end of the golf club shaft 30 the protective tape 80 is peeled off the adhesive layer 76 of adhesive carrier A, as indicated in FIG. 18. Thereafter, the upper end of the golf club shaft is manipulated into the confines of the sleeve 36' by separating the sleeve along its slit 70, as shown in FIG. 19. The next step is to wrap the strip S over the sleeve 36' as described hereinbefore with the side edges of the strip S in tight abutment.

It should also be noted that although the longitudinal profile of the sleeves 36 and 36' may be the same as the longitudinal profile of the upper portion of the golf club shaft 30 it is also possible to utilize a longitudinal sleeve profile different from that of the golf club shaft profile. The profile of the sleeve and hence of the grip after the strip has been wrapped around the sleeve may assume a desired configuration corresponding to size and shape of the golfer's hands to thereby provide maximum comfort and further enhance control over the golf club during play.

It should be noted that the aforedescribed golf club grips embodying the present invention may be utilized as original equipment on a golf club or, alternatively, may be utilized as replacements for an original golf club grip. Installation of the golf club grips of the present invention may be readily accomplished by the average golfer. Accordingly, the golfer is not required to leave his golf clubs at a golf shop for several days in order to have his original golf club grips replaced. Also, the cost of replacing an original golf club grip with a golf club grip embodying the present invention is less than the cost of replacing a conventional grip. Golf club grips embodying the present invention also provide a firm grasp of the grip by the golfer, even when such grip is dampened, as for example, when playing under rainy conditions or by contact with perspiration formed on the golfer's hands. The grip also absorbs more vibration and shock than conventional grips and thereby reduces hand fatigue and prevents injury of a golfer's hand, wrist, and arm. Accordingly, the golfer can maintain a better hold on the grip than with conventional grips and can thereby maintain better control of his golf swing. Such control is enhanced by the tackiness inherent to the polyurethane layer of the grip. Also, golf club grips embodying the present invention enhance the player's feel and control during a swing by eliminating the need to wear a glove which protects against skin abrasion.

It should be particularly noted that the grip of the present invention is lighter in weight than conventional grips. Accordingly, more weight is distributed to the club head thereby increasing club head speed without increasing the weight of the golf clubs. By way of example, a grip embodying the present invention, when applicant's strip is used in conjunction with a bare shaft as shown in FIGS. 4, 8, and 10–13, may have a weight of about 10–13 grams, as compared to a conventional grip weighing between 53–57 grams. Such weight savings moves the center of gravity of the golf club closer to the clubhead, increases the club's moment of inertia, and reduces the overall weight of the club and thereby permits a higher clubhead speed for greater distance. Less shaft twist is also achieved. Applicant's unique lightweight cap C contributes to the 10–13 gram weight of applicant's grip while positively restraining unraveling of the strip relative to the club shaft.

The heavy swing weight made possible by applying applicant's grip of FIGS. 4, 8, and 10–13 is diagrametrically shown in FIGS. 20 and 21. Referring thereto, FIG. 20 shows a golf club GC which utilizes applicant's grip, while FIG. 21 illustrates a standard golf club GS utilizing a prior art grip. The center of gravity of the two clubs are shown at 75 and 76, respectively. It will be apparent that the use of applicant's grip positions the center of gravity considerably closer to the head 77 of the club GC than the head 78 in the case of a standard club GS. In this manner, higher clubhead speed can be achieved as described hereinabove. It has been determined that the standard driver golf club has a weight of about 312–340 grams and a swing weight of D-1, while a driver utilizing a grip of the present invention can be made to weight about 255 grams and a swing weight of D-8. "Swing weight" is generally calculated as the weight attached to the butt end of a golf club shaft required to balance the club on a fulcrum placed 12 inches from the butt end of the golf shaft.

If desired, the grip receiving portion of the shaft may be expanded radially at a greater angle than the main portion of the shaft to enhance the grasp of the grip by a golfer.

Various modifications and changes may be made with respect to the foregoing detailed description without departing from the spirit of the claimed invention.

What is claimed is:

1. A slip-on golf club grip, comprising:

a strip consisting of an open-pored felt layer having an inner surface and an outer surface, and a closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorbs shocks and provides tackiness so as to inhibit slippage of a user's hand relative to the shaft;

a resilient sleeve, with the upper end of the sleeve being formed with a cap and the lower end of the sleeve being formed with a reinforcing cylinder; and the strip being spirally wrapped about the sleeve between the bottom of the cap and the top of the reinforcing cylinder.

2. A slip-on golf club grip as set forth in claim 1 wherein the upper end of the sleeve below the cap is formed with a recess and the butt end of the strip is formed with a tongue, said tongue fitting snugly with the recess when the strip is wrapped about the sleeve to provide a smooth configuration of the strip relative to the sleeve.

3. A slip-on grip as set forth in claim 2 wherein the strip is formed with air-passing perforations that enhance the rate of absorption of perspiration from a user's hands and also enhance the cushioning effect of the grip by controlling restriction of air escaping from within the grip when the grip is grasped by a user.

4. A slip-on golf club grip as set forth in claim 1 wherein the strip is formed with air-passing perforations that enhance the rate of absorption of perspiration from a user's hands and also enhance the cushioning effect of the grip by controlling restriction of air escaping from within the grip when the grip is grasped by a user.

* * * * *